Nov. 8, 1932.　　　G. LOENING　　　1,887,357
RETRACTABLE LANDING GEAR
Filed Jan. 3, 1931　　　2 Sheets-Sheet 2
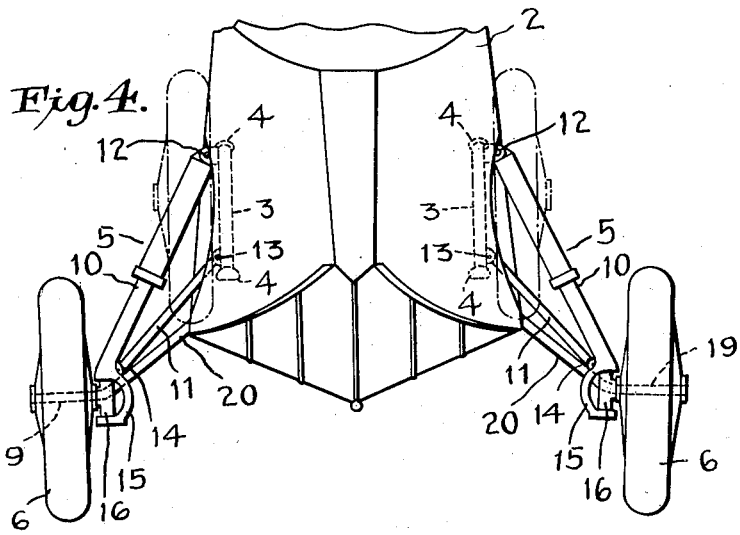
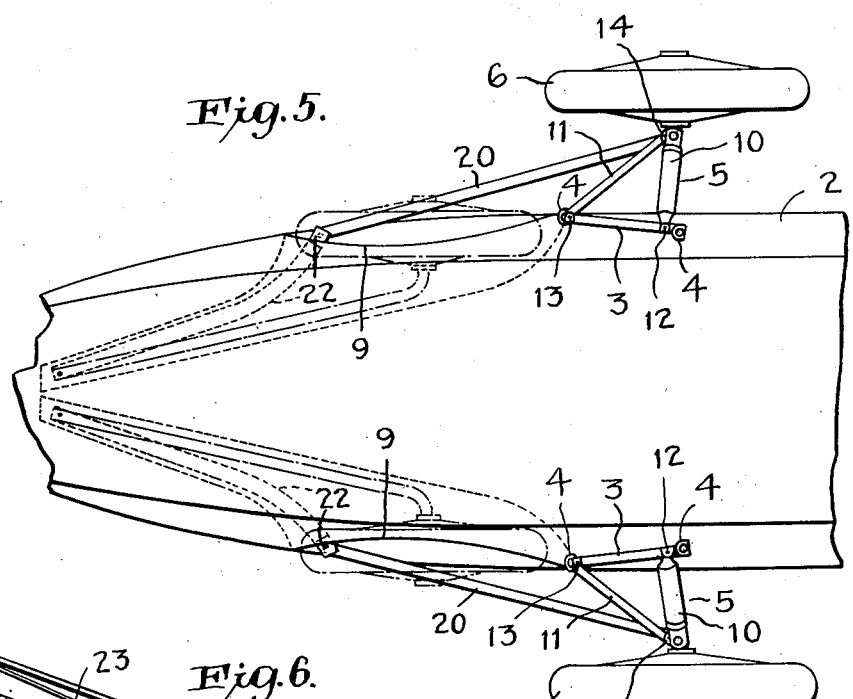
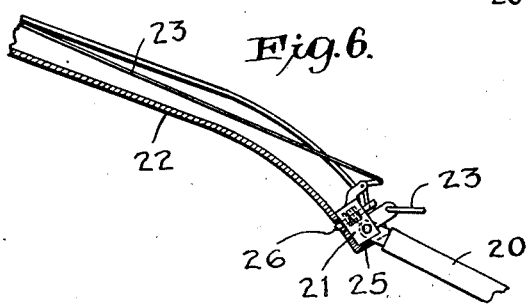
INVENTOR
Grover Loening
BY
ATTORNEY Patented Nov. 8, 1932

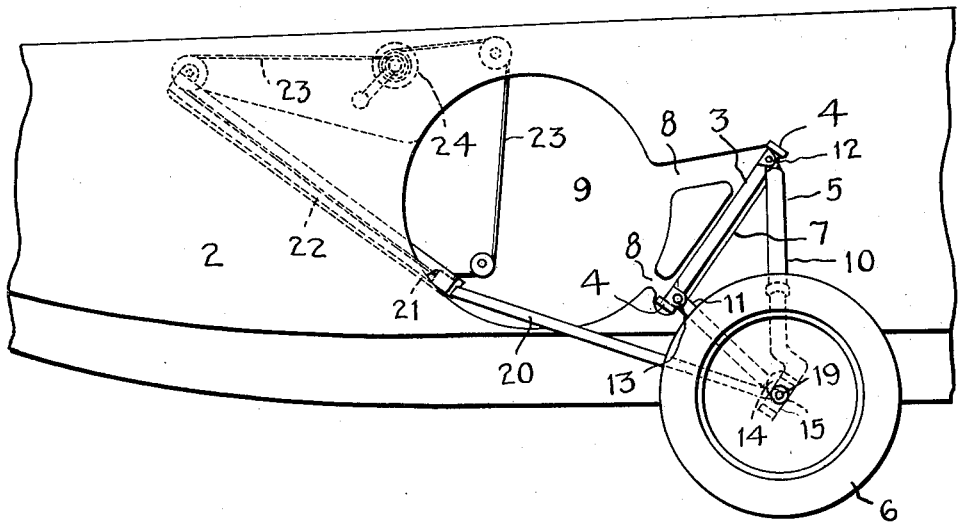
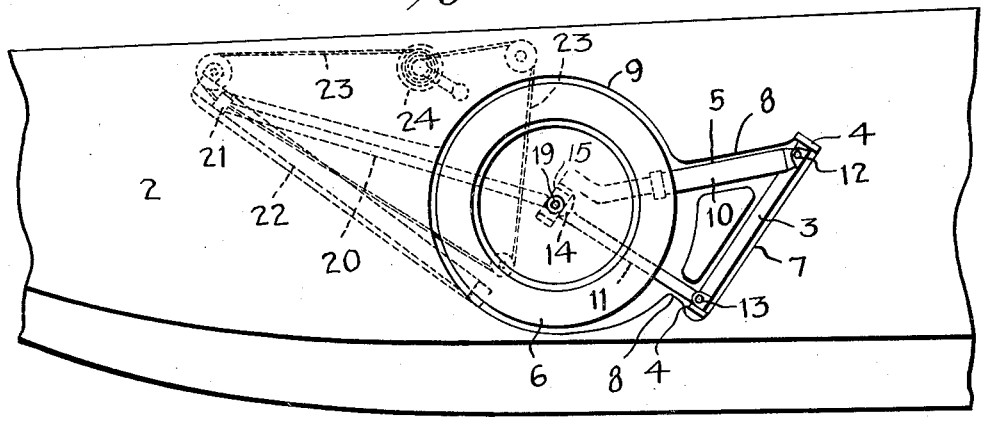
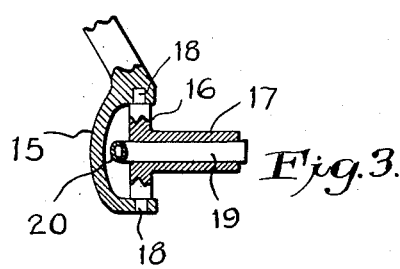

1,887,357

UNITED STATES PATENT OFFICE

GROVER LOENING, OF NEW YORK, N. Y., ASSIGNOR TO GROVER LOENING AIRCRAFT COMPANY, INC., OF GARDEN CITY, NEW YORK, A CORPORATION OF NEW YORK

RETRACTABLE LANDING GEAR

Application filed January 3, 1931. Serial No. 506,333.

Objects of the invention are compactness, simplicity, lightness, ease of operation, and advantages in respect to the manner in which stresses are sustained, and in respect to the utilization of space in the hollow body or bodies to which the gear is attached.

In a common form of retractable landing gear the wheels are carried by frames which swing in substantially vertical arcs transverse to the length or fore-and-aft direction of the machine, the axes on which these frames turn being disposed substantially horizontally and longitudinally. In such gears the operating rods, screws or linkage connected to the frames have to take so much of the force of the landing stresses that the mechanism not infrequently becomes deranged even though it be quite heavily and strongly built. Furthermore, the portion of the body, hull or floats given over to the operating mechanism, wheel-pockets, etc., may, depending on the design of the machine, be one which it would otherwise be desirable to be able to use for the pilot's place, passenger room or other purpose.

In the landing gear of the present invention, wheel-carrying frames are mounted to swing on axes disposed at pronounced inclinations in the longitudinal planes, so that the two sides of the gear are protracted and retracted in diagonal arcs. The inclination of the hinge axes is such that the wheels are transported lengthwise of the carrying body or bodies at the same time that they are raised and drawn inward to the body for retraction and lowered and spread outward for protraction. The inclination of the axes is preferably as steep as will permit of the necessary raising and lowering of the wheels.

The wheel-supports are connected to the frames by swivels so that the wheels are not stowed edgewise into the body but are placed flat alongside or in shallow depressions when retracted.

The two parts of the landing gear are preferably operated through translational members united to or integral with the swiveled wheel-supports, these members ranging at suitable inclinations lengthwise of the carrying body.

Among other results, this landing gear resists and transmits to the carrying body or framework the stresses of landings in a highly advantageous manner, and relieves the operating mechanism.

Another important advantage is that space in the hull or fuselage can be utilized to better effect. With former types of landing gears swinging in substantially vertical transverse arcs the zone of the carrying body between the wheels was apt to be rendered useless for other purposes by reason of the presence of wheel pockets and operating mechanism. With my landing gear, in which the wheels are moved largely in a lengthwise direction and in which the operating mechanism is disposed forwardly or rearwardly, the pilot or a passenger can sit between the landing positions of the wheels, or this space can be used in any other way.

In the embodiment illustrated herein, which is preferred for most purposes and more particularly for tractor machines, the landing gear is folded forward of the hull or body where there is room that can be conveniently assigned to it. For other machines, including certain machines of the pusher class, it would be desirable to reverse the longitudinal inclination of the main hinge axes, and to dispose the operating parts rearwardly, so that the gear would then be folded in a backward direction.

Other features and advantages of the new landing gear will be apparent to those skilled in the art.

In the accompanying drawings, forming part hereof:

Fig. 1 is a side elevation of the forward part of the hull of a flying-boat amphibian, showing the landing gear protracted;

Fig. 2 is a similar view, showing the landing gear retracted;

Fig. 3 is a detail sectional view;

Fig. 4 is a front elevation showing the two halves of the landing gear protracted;

Fig. 5 is a plan view, showing the landing gear protracted in full lines and retracted in broken lines; and Fig. 6 is a longitudinal section through a guide, showing a portion of a translational rod in plan, this rod being in its outer position.

The landing gear is shown applied to the hull 2 of an amphibian flying-boat machine. At each side of the hull or carrying body is a hinge axle 3 turning in bearings 4. These axles, the triangularly braced swinging frames 5 of which they form a part, and the wheels 6 carried by the frames, are preferably absorbed, partly or wholly in depressions 7, 8, 9 in the sides of the hull, when the landing gear is retracted. The external parts of the landing gear then lying substantially flat with the sides of the hull offer at most a small head resistance.

The axes of the hinges 3, 4 lie in inclined positions in planes substantially in or parallel with the sides of the hull, that is to say in more or less vertical planes, and as shown the hinge axes incline forward and downward in these general planes. This disposition of the principal axes of the landing gear is of great importance.

Each frame 5 includes a strut 10 connected to the upper end of the axle 3, and a strut or tension member 11 connected to the lower end of the axle, these two members converging together at the center of the wheel, where they are connected. The construction of the frames may be varied.

The strut 10 preferably contains a provision for absorbing shock, which may be accomplished by making this strut after the manner of a telescopic hydraulic (oil) shock-absorber. When this provision is included, the members of the frame are connected together by pivot joints to allow for shortening and extension of the member 10. Thus, the upper end of the member 10 is indicated as being pivoted at 12 to the upper end of the axle 3, the inner end of the member 11 as being pivoted at 13 to the lower end of the axle, and the outer ends of the members 10 and 11 as being pivoted together at 14. If other provisions for taking up shock are utilized, or if the wheels have rubber tires which are large enough for that purpose, such pivot connections between the parts of the frame can be omitted and the frame can then be a rigid structure.

The lower end of each strut 10, that is to say the end of each swinging frame, is formed with a yoke 15 to embrace the head 16 of a tubular wheel axle or sleeve 17, said head having reversely disposed trunnions 18 which are held and can turn freely in sockets of the yoke. The axis of the swivel joint thus obtained is parallel with the axis 3 and lies in a plane which also includes the longitudinal axis of the strut 10, though the precise relations may vary.

Within the axle sleeve 17 there is a center axle 19, which can turn if need be in the sleeve, this center axle being bent outward from a translational rod 20. The hub of the wheel is mounted rotatably on the sleeve 17. The provision of the sleeve 17 is a convenient way of securing a swivel connection between the wheel support, or axle, and the end of the swinging frame 5, but the particular construction is not essential.

The rods 20 extend forward from the wheels, inclining upwardly and inwardly. The forward end of each of the translation rods 20 is suitably connected to a terminal 21 which travels in a slotted guide 22. This guide ranges forwardly, upwardly and inwardly of the hull, and is preferably so disposed that the wheel remains substantially parallel to itself, that is to say it lies in substantially vertical longitudinal planes, when it is retracted and when it is protracted. The swivel joint 18 between the wheel support and the swinging frame 5 is useful in this connection.

The terminals 21 at the forward ends of the rods 20 are connected to cables 23 which pass over guides to a suitable operating drum 24, which may be located at any convenient point in the interior of the body.

The landing gear is preferably stayed in the protracted condition by stops 25 (Fig. 6) at the rear or outer ends of the guides 22, which are then abutted by the terminals 21 of the rods 20. Suitable catches or abutments, from which the gear can be released, are also provided to keep the gear from folding forward and letting the hull down on the ground when the machine rests on the wheels. As indicated at 26, these may take the form of spring-pressed catches on the terminals 21 of the rods 20, these catches taking into openings in the guides 22 when the gear is fully protracted and being connected with the retracting cables in such manner that the first effect of winding up this cable is to release the catches, whereupon the gear is retracted.

When the landing gear is retracted the two wheel-carrying frames swing forwardly, upwardly and inwardly about the axes of the inclined hinge axles 3. Conversely, when the landing gear is protracted the frames swing rearwardly, downwardly and outwardly. By virtue of this plan the wheels are raised by being drawn to forward positions, and the space which is taken away from the interior of the hull for the purposes of the landing gear is so far forward that it can be readily spared. It results that the interior of the hull can be used to better advantage than would otherwise be possible.

When the landing gear is protracted, the wheels are moved rearward, downward and outward, and are projected below the bottom of the hull far enough back for proper landing. In the landing condition, the wheels are disposed outwardly from the sides of the carrying body so as to give a wheel-base of proper width.

When the gear is protracted or retracted, the ends of the swinging frames 5 swivel at 18 with respect to the wheel supports, the orientation of which remains substantially constant. Consequently, when the gear is retracted, the wheels are laid forwardly alongside the hull. In this operation the wheels are drawn forward, upward and inward and are laid flat against or into the sides of the hull.

In the protracted condition of the gear, a large part of the stresses of landing are transmitted through the main hinges 3, 4 directly to the structure of the hull, and the operating rods 20 are relieved of severe compression stresses, whereas in most landing gears the arrangement of the mechanism is such that the operating members are called upon to resist and transmit a very heavy compression stress. In this embodiment of the invention the rearward component of force developed when the wheels roll on terra firma may place the rods 20 under moderate tension, which is resisted by suitable stops, and when the machine comes to rest there is only a moderate forward thrust on the rods, which is easily resisted by suitable stops or catches.

In the foregoing the landing gear has been described as folding forwardly of the hull and unfolding rearwardly, which arrangement has special advantages, but the invention is equally applicable in a reverse arrangement. Thus, if we consider that the rear end of the carrying body is at the left of Figs. 1 and 2 and the front end at the right, it will be seen that the hinge axes then incline downward and rearward, that the translational rods range rearward, and that the wheel-carrying frames 5 are swung rearward, upward and inward to retract the gear, and forward, downward and outward for landing.

It will be understood that the invention is susceptible of embodiment in various modifications and that there may be changes in the way of addition, omission or substitution of parts without departing from essentials. The drawing and description are primarily illustrative and the claims are intended to cover the generic and specific aspects of the invention and all statements of scope which as a matter of language might be said to fall between them.

I claim:

1. A retractable landing gear comprising wheel-carrying frames hinged on longitudinally inclined axes, wheel-supports, swivel connections between said wheel supports and frames so constructed that the wheels keep approximately vertical positions, and means for operating the gear to retract the wheels in a motion that transports the wheels in a fore or aft direction at the same time that it carries them upward and inward for retraction or downward and outward for protraction.

2. A retractable landing gear comprising wheel-carrying frames hinged on longitudinally inclined axes, wheel-supports, swivel connections between said wheel supports and frames so constructed that the wheels keep approximately vertical positions, translational operating rods connected to said wheel-supports, guides for said rods, operating connections connected with said rods, and stops cooperative with the rods when the gear is protracted.

3. A retractable landing gear comprising swinging wheel-carrying frames hinged on longitudinally inclined axes, wheel-supports, swivel connections between said wheel supports and frames so constructed that the wheels keep approximately vertical positions, and means for operating the gear to retract the wheels forward, upward and inward alongside the carrying body and to move them rearward, downward and outward to landing positions.

4. A retractable landing gear comprising a swinging frame turning on an inclined axis so that the frame swings forward, upward and inward or rearward, downward and outward in the retraction and protraction of the gear, respectively, a wheel-support, a swivel connection between the wheel-support and the frame so constructed that the wheel keeps an approximately vertical position, enabling it to be drawn close in to the side of the carrying body in a forward position, and a forwardly extending translational part controlling the retraction and protraction of the gear.

5. A retractable landing gear comprising a swinging frame turning on an inclined axis so that the frame swings forward, upward and inward or rearward, downward and outward in the retraction and protraction of the gear, respectively, a wheel-support, a swivel connection between the wheel-support and the frame so constructed that the wheel keeps an approximately vertical position, enabling it to be drawn close in to the side of the carrying body in a forward position, a translation rod connected to said wheel-support, a guide for said rod ranging forward, upward and inward of the carrying body, and operating connections connected to said rod.

6. A retractable landing gear comprising a swinging frame turning on an inclined axis so that the frame swings forward, upward and inward or rearward, downward and outward in the retraction and protraction of the gear, respectively, a wheel-support, a swivel connection between the wheel-support and the frame so constructed that the wheel keeps an approximately vertical position, enabling it to be drawn close in to the side of the carrying body in a forward position, a translation rod connected to said wheel-support, a guide for said rod ranging forward, upward and inward of the carrying body, operating connections connected to said rod, and stops cooperative with said rod when the gear is protracted.

7. A retractable landing gear as set forth in claim 1, wherein each of the swinging frames comprises flexibly jointed members one of which contains a shock-absorbing provision.

GROVER LOENING.